United States Patent [19]
Noble, Jr.

[11] Patent Number: 5,498,161
[45] Date of Patent: Mar. 12, 1996

[54] ANTI-G SUIT SIMULATOR

[75] Inventor: Walter E. Noble, Jr., Levittown, N.Y.

[73] Assignee: Northrop Grumman Corporation, Los Angeles, Calif.

[21] Appl. No.: 311,178

[22] Filed: Sep. 23, 1994

[51] Int. Cl.⁶ .................................................. G09B 9/08
[52] U.S. Cl. .................................................. 434/59
[58] Field of Search ...................... 434/59, 45; 600/19, 600/20; 2/2.11

[56] References Cited

U.S. PATENT DOCUMENTS

| | | | |
|---|---|---|---|
| 2,741,036 | 4/1956 | Amico | 434/59 |
| 3,097,436 | 7/1963 | Gaucher | 434/59 |
| 3,270,440 | 9/1966 | Radosevic, Jr. | 434/59 |
| 3,300,878 | 1/1967 | Butcher et al. | 434/59 |
| 3,780,723 | 12/1973 | Van Patten et al. | 128/1 A |
| 3,983,640 | 10/1956 | Cardullo et al. | 434/59 |
| 4,030,207 | 6/1977 | Kron | 434/59 |
| 4,059,909 | 11/1977 | Kron | 434/59 |
| 4,164,079 | 8/1979 | Ashworth | 35/12 E |
| 4,321,044 | 3/1982 | Kron | 434/59 |
| 4,534,338 | 8/1985 | Crosbie et al. | 128/1 A |
| 4,736,731 | 4/1988 | Van Patten | 128/1 A |
| 4,895,320 | 1/1990 | Armstrong | 244/118.5 |
| 4,906,990 | 3/1990 | Robinson | 340/945 |
| 5,007,893 | 4/1991 | Row | 600/20 |
| 5,027,437 | 7/1991 | Reddemann et al. | 2/81 |
| 5,255,452 | 10/1993 | Jackson et al. | 36/113 |
| 5,277,693 | 1/1994 | McCollor et al. | 600/19 |

Primary Examiner—Robert A. Hafer
Assistant Examiner—Michael O'Neill
Attorney, Agent, or Firm—Terry J. Anderson; Karl J. Hoch, Jr.

[57] ABSTRACT

An anti-G suit simulation system and especially pertains to an arrangement or system for simulating realistic acceleration conditions which are normally encountered during strenuous maneuvers carried out by pilots operating high-performance aircraft, such as jet fighter aircraft. More particularly, there is disclosed an anti-G simulation system wherein aircraft simulator pilots are exposed to physical conditions which rapidly and faithfully simulate and compensate for changes in high-intensity accelerations and gravitational effects or so-called G-conditions which are ordinarily encountered by the pilots of high-performance aircraft during the execution of aircraft maneuvers. Provided is a novel high/low-pressure vacuum system in which a series of solenoid valves are controllably connected to a source of high-pressure operating air and respectively, in a selective mode to high-pressure and low-pressure pumps which are adapted to be actuated responsive to signals received from a simulator computer so as to controllably evacuate the anti-G suit in conformance with specific reductions in G-forces simulated by the system.

5 Claims, 2 Drawing Sheets

ANTI-G SUIT SIMULATOR

BACKGROUND OF THE INVENTION

1. Field of the Invention

The present invention relates to an anti-G suit simulation system and especially pertains to an arrangement or system for simulating realistic acceleration conditions which are normally encountered during strenuous maneuvers carried out by pilots operating high-performance aircraft, such as jet fighter aircraft. More particularly, the invention pertains to an anti-G simulation system wherein aircraft simulator pilots are exposed to physical conditions which rapidly and faithfully simulate and compensate for changes in high-intensity accelerations and gravitational effects or so-called G-conditions which are ordinarily encountered by the pilots of high-performance aircraft during the execution of aircraft maneuvers.

During the operation of high performance aircraft, such as jet fighter aircraft or the like, in the implementation of flight maneuvers in which the aircraft rapidly and dramatically deviates from a normally horizontal path of flight, for instance, during steep climbs and descents, pilots are generally subjected to the physical effects of intense or high gravitational forces, generally referred to as G-forces, as a result of the extreme accelerations carried out by the changes in speed and direction of travel of the aircraft, which, in the absence of protective measures, may lead to serious physical and potentially even fatal consequences to the pilot of the aircraft. These conditions may evidence themselves as so-called grayouts or blackouts due to a loss of the flow of blood to the pilot's head, resulting in possible loss of orientation with consequent impairment of pilot judgement, loss of consciousness and control over the aircraft in view of the high-performance aircraft sustaining gravitational forces of up to 9 G (9 times the force of gravity) or even higher within a span of time of only a few seconds because of the intense maneuvers. These physical phenomena or conditions which are encountered by a pilot when pulling back hard on an aircraft control stick in order to accomplish a rapid climb or descent or to implement a fast banking turn, pose the danger to the pilot of a loss in combat effectiveness, and are frought with the danger of potentially fatal results.

In order to counteract the deleterious physical effects due to extreme or intense G-forces to which pilots are subjected during the rapid and high-speed maneuvers of such high-performance aircraft, in the aircraft and aerospace technology there have been developed anti-G suits (also designated as G-suits) which have presently reached a high degree of sophistication. Such anti-G suits, which have been in widespread use for many years, particularly in military aviation and aerospace applications, are pressurized at controlled rates in correlation with the variable G-forces acting on the pilot wearing the G-suit, so as to rapidly counteract any potentially harmful physical effects which may be produced through the G-forces generated by the high speed maneuvers of the aircraft. Reversely, as the G-forces acting on the aircraft, and resultingly on the pilot, are lessened due to the aircraft being maneuvered into more level flight, the pressure in the anti-G suit is correspondingly reduced so as to impart to the pilot a physical condition at which the pressure of the G-suit conforms to a basic G-force; in effect, normal gravity.

For purposes of pilot training and physical and psychological conditioning, in order to simulate the G-force responsive conditions effectuated in the pressurization of anti-G suits worn by pilots, whereby such conditions are normally encountered by pilots during actual flight in implementing high-speed maneuvers of high-performance aircraft, there have been developed flight simulators which attempt to duplicate the actual conditions of flight of intensely maneuvering aircraft under rapidly changing G-forces so as to enable pilots to develop a "feel" for the accelerations and quickly varying high G-forces which are normally encountered during the operation of the high-performance aircraft without actually subjecting a pilot and aircraft to the dangerous risks derived from those G-forces. Although state-of-the-art anti-G suit flight simulators and attendant control systems for operating the simulators are technologically advanced in meeting the basic requirements in the generating of simulated high-performance flight conditions and resultant G-forces which are ordinarily imposed on aircraft pilots, these currently employed simulators are still subject to the limitations in that the simulation systems have been unable to duplicate actual conditions in varying and relieving the pressures which have been generated and reign in the anti-G suits during periods when the aircraft (or simulated aircraft) reverts to normal level flight from preceding high G-forces which are due to rapid high-speed maneuvers. Although these conditions should be ideally attainable through a rapid and controlled evacuation of or regulation of the pressure reigning in the anti-G suit; for instance, in correlation with the reducing G-forces signifying return of the simulated condition of the aircraft flight simulator to normal or level aircraft flight, in actual practice a satisfactory level of control or pressure regulation in evacuating the anti-G suit has not yet been fully achieved in the current flight simulator technology.

2. Discussion of the Prior Art

Although various patents are currently existent which address themselves to alleviating the problems due to G-forces which are imposed on the pilots of high-performance aircraft, and also to the close simulation thereof, these have not yet fully met the requirements of providing ideally simulated aircraft performance characteristics in anti-G suits worn by pilots.

Ashworth U.S. Pat. No. 4,164,079 discloses an aircraft seat cushion which is controllably inflatable in response to realistic acceleration cues imparted to an aircraft simulator pilot. Although the seat cushion is inflated at controlled rates in conformance with simulated acceleration conditions to which an aircraft pilot may be subjected, there is no disclosure of a similarly controlled simulation of aircraft performance during rapid deceleration or reduction of such G-forces necessitating concomitant controlled evacuation of the seat cushion.

Armstrong U.S. Pat. No. 4,895,320 discloses a control system for an anti-G suit functioning in conformance with the performance or maneuvers carried out by a high-performance aircraft. Again, there is no disclosure of an anti-G suit simulation system wherein the simulated acceleration maneuvers and also the deceleration aspects of a high-performance aircraft are closely duplicated in regulating the pressure conditions reigning in the anti-G suit.

Van Patten U.S. Pat. No. 4,736,731 discloses a rapidly acting electro-pneumatic anti-G suit control valve which is utilized in an installation for controlling the inflation rate of an anti-G suit. However, there is no disclosure of a system for correlating all of the conditions encountered during the deflation or evacuation of the anti-G suit at a controlled rate in close conformance with rapid changes in G-forces acting on a simulation pilot to an extent which would provide ideal simulation characteristics of actual aircraft performance and physical effects encountered by the pilot.

SUMMARY OF THE INVENTION

In order to obviate or extensively ameliorate the disadvantages and limitations encountered in prior art flight simulators with respect to the controlled evacuation of anti-G suits and in order to closely approximate actual conditions acting on a pilot in a high-performance aircraft during its rapid return to normal or level flight conditions, the invention contemplates the provision of a novel high/low-pressure vacuum system in which a series of high-pressure and low-pressure pumps are controllably connected to a source of high-pressure operating air by way of a series of solenoid-operated valves which are activated responsive to signals received from a simulator computer so as to controllably evacuate the anti-G suit in conformance with specific reductions in G-forces simulated by the system. In particular, when the G-forces reduce from levels which are in a low range, only selective of the solenoid valves will cause actuation of the low-pressure pump in order to vent or dump pressurized air from the anti-G suit; while G-forces reducing from an intermediate or medium level of G-forces will cause selected of the solenoid valves to actuate only the high-pressure pump of the system for evacuating the anti-G suit; whereas for reductions from extreme or high levels of G-forces, both the low-pressure and high-pressure pumps of the system will be simultaneously actuated by the solenoid valves to effectuate a rapid evacuation of the anti-G suit in close simulation of actual conditions which would be encountered by a pilot in a high-performance aircraft.

Accordingly, it is an object of the present invention to provide an anti-G suit simulation system which will closely conform to actual intensive aircraft maneuvering characteristics and G-forces which are imparted to an aircraft pilot.

Another object of the present invention is to provide an anti-G suit simulation system of the type described which will afford a rapid and highly accurate control over the evacuation of a pressurized anti-G suit during a reduction of simulated G-forces in correlated synchronism with the intensity of simulated maneuvers carried out by an aircraft simulator pilot.

Still another object of the present invention is to provide a simple and inexpensive anti-G suit simulation system for selectively controlling anti-G suit pressurization changes and evacuation in a flight simulator in close conformance with actual conditions of flight normally encountered by the pilot of a high-performance aircraft during intense maneuvers subject to high level and rapidly changing G-forces.

BRIEF DESCRIPTION OF THE DRAWINGS

Reference may now be had to the following detailed description of an exemplary embodiment of an anti-G suit simulation system for high-performance aircraft simulators pursuant to the invention, taken in conjunction with the accompanying drawings; in which.

DETAILED DESCRIPTION OF A PREFERRED EMBODIMENT

Figure 1:
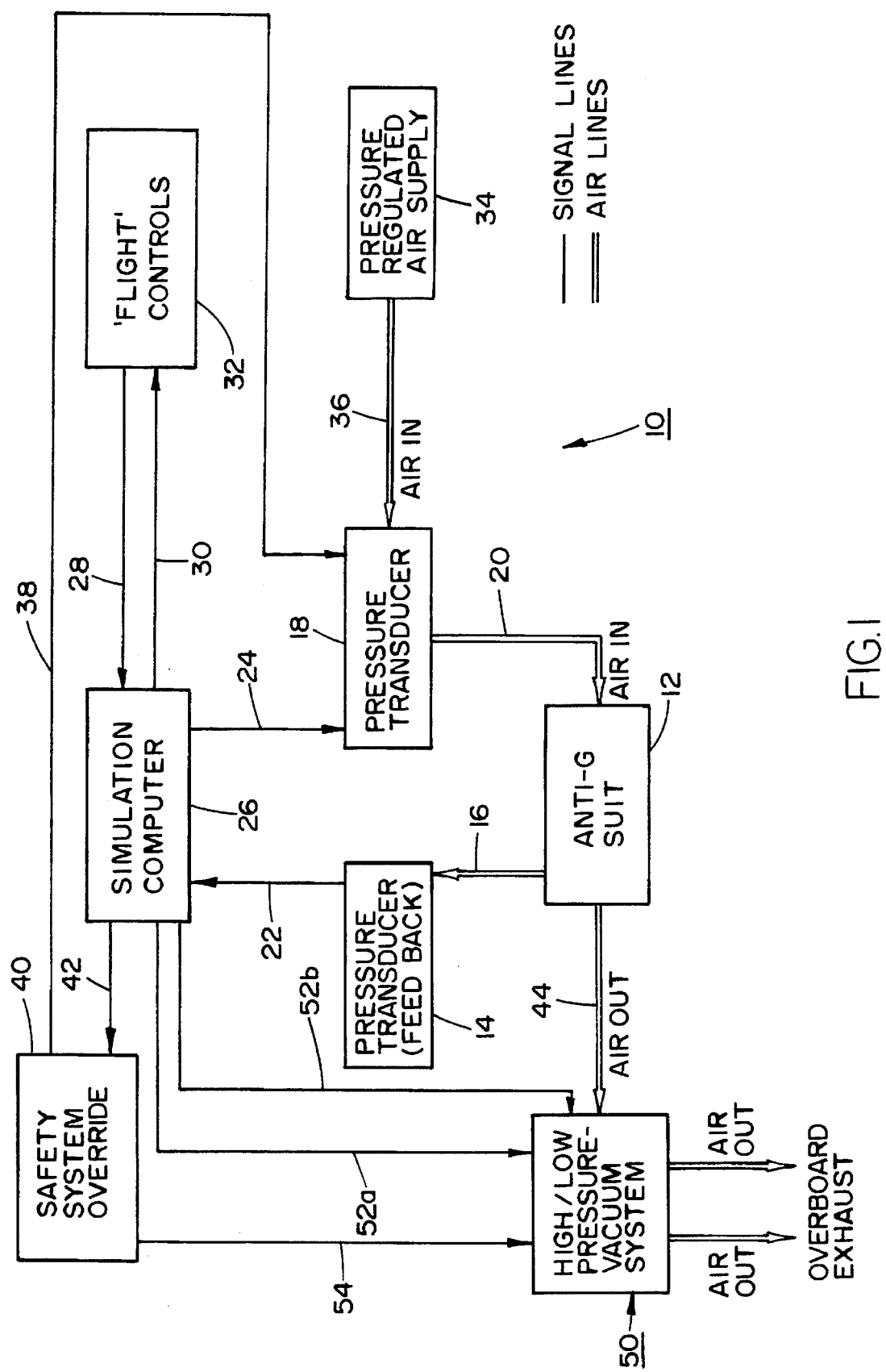
FIG. 1 illustrates a block circuit diagram of an anti-G suit simulation system incorporating an anti-G suit high/low pressure-vacuum system pursuant to the invention.

Referring specifically to FIG. 1 of the drawings, there is illustrated a general block circuit diagram of an anti-G suit simulation system 10. The simulation system includes an anti-G suit 12 (or G-suit as also frequently referred to in the technology), wherein the anti-G suit 12 is adapted to be worn by a simulator pilot in a suitable flight simulator (not shown) which is designed to simulate the flight maneuvers of high-performance aircraft, such as jet fighters. The anti-G suit 12 is operatively connected to a first pressure transducer 14 through a pressurized air line 16, and to a pressure transducer 18 through a pressurized air line 20. In turn, the transducers 14 and 18 are each respectively connected through signal lines 22 and 24 with a simulation computer 26. The simulation computer 26 is connected through a signal input line 28 and signal output line 30 to suitable simulator flight control devices 32, the latter of which simulates the controls of an aircraft being manipulated by a simulation pilot.

A pressure-regulated air supply which, for example, may be at a pressure of about 20 psig, emanating from a suitable source 34 of pressurized air, is connected to the pressure transducer 18 through an air infeed line 36. A signal transmission line 38 leading from a safety system-override arrangement 40 may be connected to the pressure transducer 18. The arrangement 40 is connected through a signal line 42 with an output of the simulation computer 26.

A pressurized-air line 44 connects the anti-G suit 12 with the inventive high/low pressure-vacuum system 50. The system 50 is also connected through signal lines 52a and 52b with an output of the simulation computer 26, and by means of a further signal line 54 to an output of the safety system-override arrangement 40.

Figure 2:
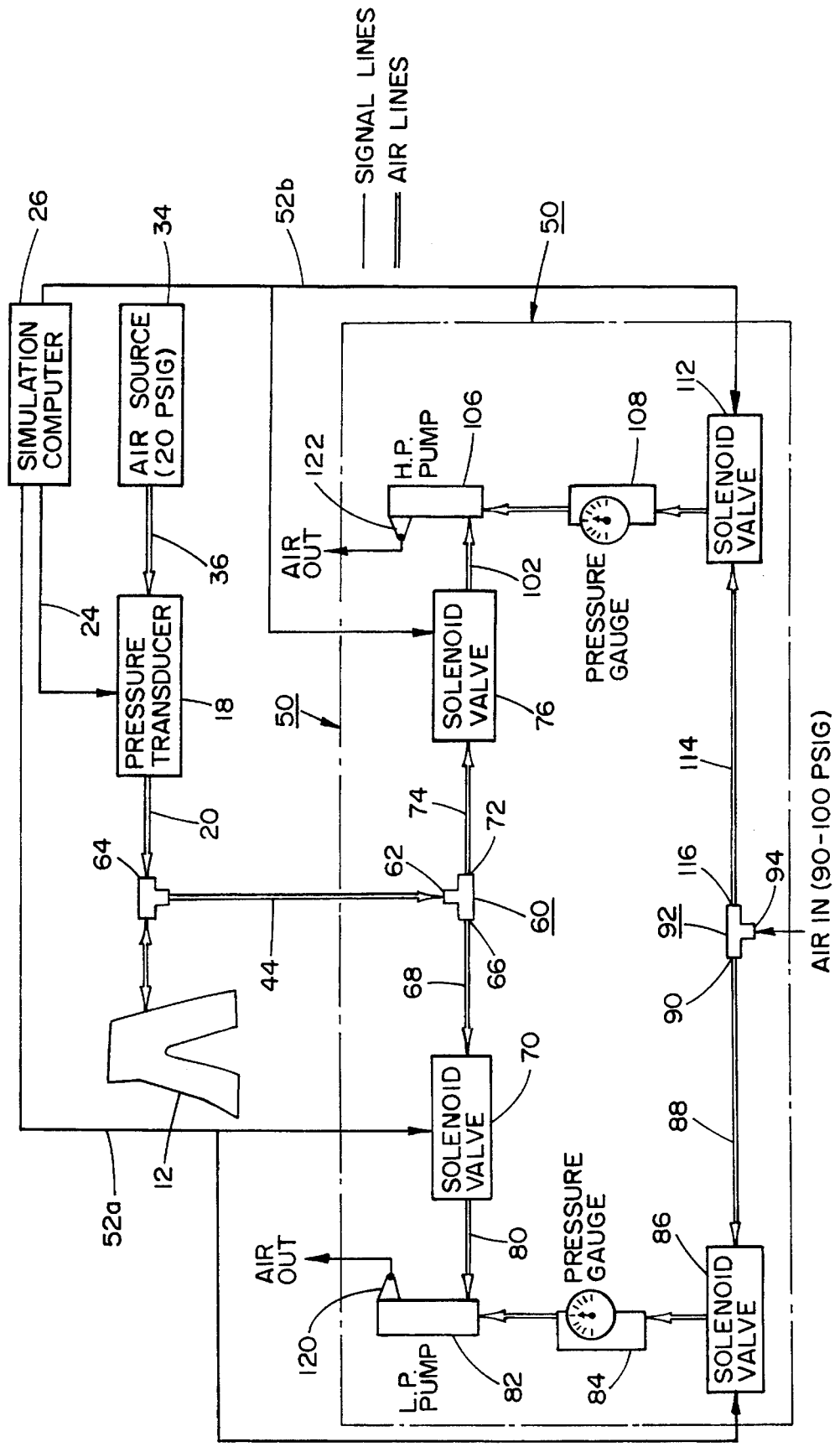
FIG. 2 illustrates a generally schematic block circuit diagram representing the high/low pressure-vacuum system of FIG. 1 for an anti-G suit simulator arrangement constructed pursuant to the inventive concept.

Reverting now in further detail to FIG. 2 of the drawings which illustrates, through the intermediary of a block circuit diagram, the particular inventive aspects of the high/low-pressure vacuum system 50 which enables implementation of the pressure-regulating and evacuating control concerned with the functioning of the anti-G suit 12, and in which components which are similar to or identical with those shown in FIG. 1 are identified by the same reference numerals, the high/low pressure-vacuum system 50 includes a T-connector 60 which has an inlet 62 connected with pressurized air line 44 leading from a connector 64 (which may be a T-connector) located in the pressurized-air line 20 extending between the pressure transducer 18 and the anti-G suit 12. The T-connector 60 has a first outlet 66 connected to a flow line or conduit 68 which leads to a first solenoid valve 70, and a second outlet 72 connected to a flow line 74 which leads to a second solenoid valve 76. The first solenoid valve 70 is connected by means of an air discharge line or conduit 80 to a low-pressure pump unit 82 which, in turn, is connected through a pressure gauge 84 to a further solenoid valve 86. The solenoid valve 86 is connected through the intermediary of a conduit 88 to a first outlet 90 of a T-connector 92, the latter of which has an inlet 94 connected to a source (not shown) for supplying highly-pressurized compressed air to the T-connector 92; for example, operating or shop air under a pressure of about 90 to 100 psig.

Similarly, the solenoid valve 76 has an air discharge conduit 102 connecting the former to a high-pressure pump unit 106 which, in turn, is connected to a pressure gauge 108 similar in construction to the pressure gauge 84. The pressure gauge 108 is connected through a line or conduit 110 to a solenoid valve 112. The solenoid valve 112 has an air inlet to which is connected by means of a conduit 114 with a second outlet 116 of the T-connector 92 so as to communicate with the source of high-pressure operating or shop air entering the inlet 94 of T-connector 92.

OPERATION OF THE SIMULATION SYSTEM

The operation of the simulation system 10, particularly demonstrating the novel functioning of the components of the high/low pressure-vacuum system 50 detailed in FIG. 2 for controlling the pressure and evacuating conditions reigning in the anti-G suit is now explained hereinbelow in connection with a typical scenario of a simulator pilot duplicating actual maneuvers of a high-performance aircraft.

Responsive to actuation or so-called "loading" by a simulator pilot, the flight controls 32 are adapted to output signals to suitable instruments and displays (not shown) to the simulation computer 26 which is programmed to simulate actual aircraft maneuvers and which transmits signals responsive thereto through signal line 24 to the pressure transducer 18. Upon a signal being transmitted indicative of an aircraft flight maneuver which generates G-forces, such as within the range of from above 1 to 9 Gs or even higher, which may be readily encountered in modern jet fighter aircraft, the pressure-regulated air supply from source 34 is caused to flow through the pressure transducer 18 which, in response to the signal voltage received from the simulation computer 26, opens an orifice proportional thereto and causes a predetermined flow of pressurized air, such as air at 20 psi gauge, to flow through the conduit 20 into the anti-G suit 12, pressurizing and inflating the latter to a predetermined degree in conformance with the simulated G-force conditions.

As the simulator pilot carries out a so-called "unloading" maneuver which causes the simulator to indicate, responsive to a signal from the flight control device 32, that the (simulated) aircraft is being maneuvered into an essentially level flight; in effect, causing a lowering of the G-force acting on the pilot, and assuming that the preceding maneuver or maneuvers causing pressurization of the anti-G suit 12 which as indicated by the simulation computer 26 had resulted in a relatively low G-force; for example, within the range of about a 1 to 2.5 G, a suitable control signal is outputted to the high/low pressure-vacuum system 50 from the simulation computer 26 so as to evacuate the anti-G suit 12 as follows:

A signal transmitted through line 52a to activate the solenoid valves 70 and 86 on the low-pressure side of the system 50 into open positions, permitting a flow of operating air from T-connector 92 (at 90 to 100 psig.) to enter the low-pressure pump 82 through solenoid valve 86 and pressure gauge 84. The same signal will resultingly actuate and open the low-pressure pump 82 allowing pressurized air from anti-G suit 12 to be evacuated through line 44 and through the opened solenoid valve 70, and to be ejected in conjunction with the operating air through a low-pressure overboard dump 120 from the low-pressure pump 82. The rate of discharge of air from the anti-G suit 12 hereby closely approximates actual aircraft operating conditions encountered by a pilot.

In the event that the previously generated simulated G-force pressurizing the suit 12 was within a medium or intermediate range; for example, at levels of between about 2.5 and 4 G, the outputted control signal from the simulation computer 26 is transmitted to system 50 through signal line 52b and will produce a similar actuation of system 50, but on the high-pressure side thereof rather than on the low-pressure side for evacuating the suit 12 more rapidly from its previous higher extent of pressurization. In this instance, rather than actuating the solenoid valves 70 and 86, the outputted control signal actuates solenoid valves 76 and 112 which are connected to the high-pressure pump 106 so as to facilitate passage to the latter through the pressure gauge 108 of operating air entering through T-connector 92. During this interval, the solenoid valves 70 and 86 inhibit any flow of pressurized air therethrough. This, in the same manner as described previously, enables the pressurized air from the anti-G suit 12 to pass through the opened solenoid valve 76 into the high-pressure pump 106 and from there to be vented and dumped out together with the operating air received from solenoid valve 112 through a high-pressure overboard dump 122 connected to a discharge of the high-pressure pump 112. This will effectuate a precisely controlled and rapid evacuation of the anti-G suit 12 closely responsive to the simulated aircraft returning from the medium range G-force conditions to a normal level aircraft operating or flight mode.

With regard to a scenario in which the simulation of the preceding aircraft maneuver represents G-forces generated in excess of 4 G; for example, up to 9 G or even higher, the signal outputted from the simulation computer 26 to effectuate evacuation of the anti-G suit 12, and which is transmitted to the system 50 through both signal lines 52a and 52b will simultaneously activate and open all of the low-pressure and high-pressure sided solenoid valves 70, 86; 76, 112 of the system 50 so as to facilitate the rapidly effected evacuation of air from the highly inflated anti-G suit 12 in order to enable simulation of actual conditions of a rapid return to normal level flight to the closest possible extent; in effect, the precise simulation of combat conditions normally experienced by a fighter pilot.

The foregoing simulation system 50 provides for a rapid and efficient evacuation of the anti-G suit 12 responsive to the various outputted signals received from the simulation computer 26 in correlation with the simulated G-loads being experienced by a simulator pilot which, in essence, is in a close and realistic correlation with the G-loads normally imposed on a pilot during the operation of actual high-performance aircraft in the implementing of intense flight maneuvers.

Furthermore, in the event of a system malfunction, indicated by a discrepancy in the voltage output to transducer 18 by flight simulator 26, and the voltage input to flight simulation computer 26 by feedback transducer 14, safety system override 40 will deny passage of pressure-regulated air through transducer 18 by means of electrical signal through line 58 to transducer 18. Simultaneously, safety system override 40 will cause continuous evacuation of anti-G suit 12 by activating all solenoid valves in the high/low pressure-vacuum system 50 by means of electrical signal through line 54. This signal from safety system override 40 to high/low pressure-vacuum system 50 is continuous until safety system override is manually switched off by attendant technicians. Activation of safety system override 40 by simulation computer 26 by means of an electrical signal through line 42 also disables simulation computer 26.

The constituents of the high/low-pressure vacuum system 50 are essentially all inexpensive and generally commercially available components which possess practically no moving parts which would be subject to frictional wear during extensive and repeated use of the system. From the foregoing it becomes readily apparent that the inventive anti-G suit pressurizing and evacuating simulation system 10 is of an extremely simple and inexpensive construction, which is of a highly reliable nature in operation and which closely conforms to realistic maneuvering conditions under extreme G-loads to which high-performance aircraft are subjected so as to enable a simulator pilot to replicate actual aircraft conditions.

Although the foregoing has been described with regard to anti-G suits, the inventive system 50 can also be employed with the inflatable seat cushions utilized by the pilots of high-performance combat aircraft.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A system for the controlled pressurization and evacuation of an anti-G suit in an aircraft flight simulator responsive to simulated maneuvers implemented by a simulator pilot; said system comprising:

means for supplying a controlled flow of pressurized air to said anti-G suit in dependence upon simulated G-forces generated by said simulated aircraft maneuvers so as to impart a specified internal pressure to said anti-G suit, said means for supplying said controlled flow of pressurized air to said anti-G suit including a pressure transducer for regulating a specified flow of said pressurized air from a source of a pressure-regulated air supply to said anti-G suit responsive to outputted signals from a simulation computer;

means for evacuating said anti-G suit responsive to simulated aircraft maneuvers indicative of a reduction in said simulated G-forces, said evacuating means including means for selectively controlling the rate of evacuation of said anti-G suit in correlation with the level of previously generated G-forces pressurizing said anti-G suit so as to closely approximate actual conditions encountered by a pilot of a high-performance aircraft, said evacuating means including a further transducer outputting signals to said simulation computer responsive to changing G-forces effecting pressurization of said anti-G suit, said means for selectively controlling the rate of evacuation of said anti-G suit being responsive to signals outputted from said simulation computer for selective actuation of means for discharging pressurized air evacuated from said anti-G suit, said selective controlling means including first valve means actuating first pump means for evacuating said anti-G suit responsive to a first signal from said simulation computer indicative of reductions in G-forces from a first range of said G-forces, second valve means actuating second pump means for evacuating said anti-G suit responsive to a second signal indicative of a reduction in G-forces from a second range of said G-forces, and a third signal from said simulation computer indicative of a reduction in G-forces from a third range of said G-forces simultaneous actuating said first and second valve means and said first and second pump means for effectuating an accelerated evacuation of said anti-G suit, said first valve means including a first solenoid valve operatively connected to said pressure transducer, said first pump means being a low-pressure pump connected to said first solenoid valve, a second solenoid valve connected to a source of high-pressure operating air, said first pump means being operatively connected to said second solenoid valve, whereby said first signal from said simulation computer actuates said first solenoid valve to conduct pressurized air from said anti-G suit to said first pump means, and said signal actuates said second solenoid valve to conduct a flow of said operating air to said first pump means so as to open said first pump means and concurrently vent said air from said anti-G suit and operating air from said first valve means, said second valve means including a third solenoid valve operatively connected to said pressure transducer, said second pump means being a high-pressure pump connected to said third solenoid valve, a fourth solenoid valve connected to said source of high-pressure operating air, said second pump means being operatively connected to said fourth solenoid valve whereby said second signal from said simulation computer actuates said third solenoid valve to conduct pressurized air from said anti-G suit to said second pump means, and said signal actuates said fourth solenoid valve to conduct a flow of said operating air to said second pump means so as to open said second pump means and concurrently vent air from said anti-G suit and operating air from said second valve means.

2. A system as claimed in claim 1, wherein said first range of G-forces is within about 1 to 2.5 G, said second range is within about 2.5 to 4.0 G, and said third range is within about 4.0 to 10.0 G.

3. A system as claimed in claim 1, wherein said pressurized air conveyed into said anti-G suit is at a pressure of about 20 psig.

4. A system as claimed in claim 1, wherein said operating air is at a pressure of about 90 to 100 psig.

5. A system as claimed in claim 1, wherein a first pressure gauge is interposed between said second solenoid valve and said first pump means; and a second pressure gauge is interposed between said fourth solenoid valve and said second pump means.

* * * * *